United States Patent [19]

Kerr

[11] Patent Number: 4,709,208
[45] Date of Patent: Nov. 24, 1987

[54] MAGNETIC MARK DETECTOR SYSTEM
[75] Inventor: Wayne L. Kerr, Houston, Tex.
[73] Assignee: Kerr Measurement Systems, Inc., Tex.
[21] Appl. No.: 810,775
[22] Filed: Dec. 19, 1985
[51] Int. Cl.$^4$ .................... G01B 7/04; G01R 33/02; H01L 43/00
[52] U.S. Cl. .................................. 324/206; 324/251; 338/32 H
[58] Field of Search ............... 324/206, 207, 208, 251, 324/252; 338/32 R, 32 H

[56] References Cited

U.S. PATENT DOCUMENTS 2,794,951 6/1957 Broding et al. ..................... 324/206
3,873,912 3/1975 Mori et al. ......................... 324/206

Primary Examiner—Reinhard J. Eisenzopf
Assistant Examiner—Walter E. Snow

[57] ABSTRACT

The present invention comprehends a magnetic mark detector system in which the magnetic detector head is customized to the magnetic span of the North/South poles of a magnetic mark on a cable and is focused to concentrate the specific magnetic characteristics of flux of the magnetic mark to a detector and to exclude the effects of extraneous earth magnetic fields. The magnetic head structure includes spaced apart elongated head members constructed from magnetic material and disposed in an end to end relationship. The head members have an overall length functionally related to the magnetic span of a magnetic mark and focus magnetic flux. Between facing ends of the head members, in a centrally located gap, is a Hall field effect device which responds to magnetic flux and produces an electrical output signal. In a detection circuit connected to the Hall device, a signal is amplified and calibrated so that the strength of the magnetic mark is measured and output to a comparator which produces indications of weak or strong marks which can be recorded.

9 Claims, 4 Drawing Figures

MAGNETIC MARK DETECTOR SYSTEM

FIELD OF THE INVENTION

This invention relates to magnetic mark detectors for detecting magnetic marks on a well logging cable used in oil well logging operations, and more particularly, a magnetic marker means for detecting the strength of magnetic marks placed on a logging cable.

BACKGROUND OF THE INVENTION

In oil field well logging operations, an armored electrical cable is connected between a surface sheeve or spool (usually on a logging truck) and a well or logging tool where the logging tool is passed through a well bore to obtain data relative to parameters of the well bore or the earth formations traversed by the well bore. The parameter data is recorded ultimately on a log or plot of the parameter or data as a function of depth. Depth is of course, a function of the length of the cable in the borehole to the well tool. In order to obtain the log correlation of parameter data relative to depth in a well bore it is necessary to measure the length of the cable in the borehole (and hence the position of a well tool) relative to the parameter data. Length of the cable can be measured mechanically with measuring wheels at the earth's surface and is commonly correlated with the length span of magnetic marks uniformly placed along the cable length. The magnetic marks are applied along the cable by placing the cable under a predetermined tension (typically 1000 pounds) and applying a magnetic mark at precise predetermined intervals (typically 1000 feet) along the entire length of cable. The magnetic mark typically has North and South poles spaced about 2 inches from one another with a magnetic strength of about 5 gauss.

In use of the cable, the cable is passed by a magnetic mark detector which detects the presence of the mark on the cable and produces a mark signal for use in the depth measurement recording. There are several problems involved with use of magnetic marks as a benchmark for length measurement of a cable. These problems include non-detection of magnetic marks on the cable because the mark has been removed or has become too weak for detection be the detector means. Existing detectors using coils or Hall devices give an indication of a magnetic mark only at relatively high gauss levels. No indication is given to the operator concerning the true gauss level of a mark thus the operator can begin an operation and find that the levels of detection used do not detect one or more marks. When this occurs, the length measurements can still be corrected provided that the operator or the equipment is aware of a missing mark. Where down hole positioning is involved, loss of a mark can seriously affect the operators ability to judge the location of the tool.

When a cable is new, it permanently stretches until it becomes "seasoned" which may be from 7 to 30 trips to a maximum tension value. The permanent stretch changes the spacing between the magnetic marks. For this reason and also when a number of marks have become non-detectable it is customary to remove the cable from service, erase the existing marks and apply new marks. In this process and on other instances, "false" or spurious marks can appear between the reference marks. Thus, an operator can have an error if a spurious mark is used in the length determination. This is particularly true where a false mark and non-detectable or missing mark are adjacent.

Another problem in mark detection is that conventional mark detectors are susceptible to the influence of the earth's magnetic field at a location where the logging operation is conducted and the earth's magnetic field can mask or adversely affect detection of both "strong" and "weak" marks, where "weak" marks are marks which are well below an original magnetic strength of a "strong" mark.

THE PRESENT INVENTION

The present invention comprehends a magnetic mark detector system in which the magnetic detector head is customized to the magnetic span of the North/South poles of a magnetic mark on a cable and is focused to concentrate the specific magnetic characteristics of flux of the magnetic mark to the effective response area of a detector and to exclude the effects of extraneous earth magnetic fields. The magnetic head structure includes spaced apart elongated head members constructed from magnetic material and disposed in an end to end relationship. The head members have an overall length functionally related to the magnetic span of a magnetic mark and focus magnetic flux to a detector. Between facing ends of the head members, in a centrally located gap, is a Hall field effect device which is a detector which responds to magnetic flux and produces an electrical output signal.

In a detection circuit connected to the Hall device, a signal is amplified and calibrated so that the strength of the magnetic mark is measured and output to comparison means which produces indications of weak or strong marks which can be recorded.

DESCRIPTION OF THE PRESENT INVENTION

Figure 1:
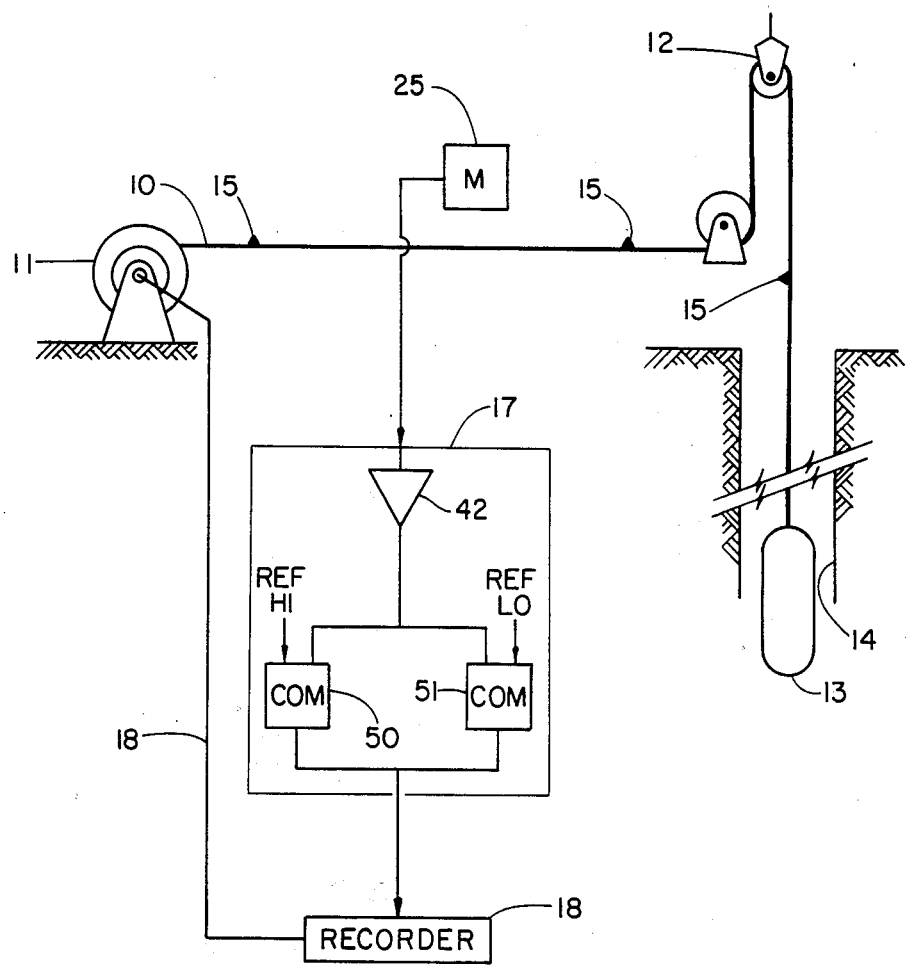
FIG. 1 illustrates schematically a logging system embodying the magnetic mark detector system of the present invention.

Referring now to the drawings, an armored electrical well logging cable 10 is spooled on a surface winch or spooling reel 11 and is passed through sheeves 12 to suspend and transport a well logging tool 13 through a borehole 14. The cable has pre-established magnetic marks 15 along its length at predetermined intervals (which are typically equally spaced intervals) and a magnetic mark detector means 25 is disposed along the cable at the surface to detect the marks and provide a detection signal to a strength measuring means 17. The measuring means 17, in turn, provides a signal representative of a mark detection to a depth recorder means 18. The depth recorder means 18 also receives signals from the well tool 13 representative of the measured parameter data via a data conduit 19 and produces a log of measured well parameter data as a function of depth.

Figure 2:
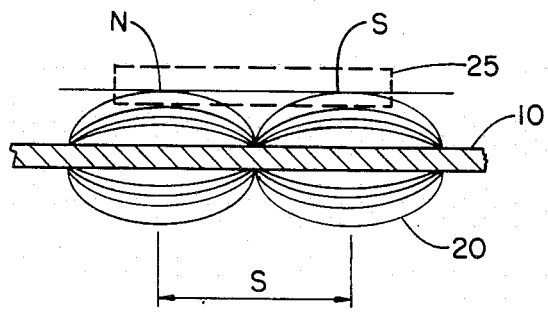
FIG. 2 is a schematic representation of a typical magnetic mark on a cable and a detector positioning.

By way of illustration, a typical magnetic mark 20 as presently utilized in well logging operations is shown in FIG. 2. The mark 20 includes North "N" and South "S" poles of magnetism where the peaks of the poles are spaced apart by a distance "S" which is typically 2 inches more or less, from one another. The magnetic mark as shown in FIG. 2 is thus predefined as to detectability of the magnetic poles.

Figure 3:
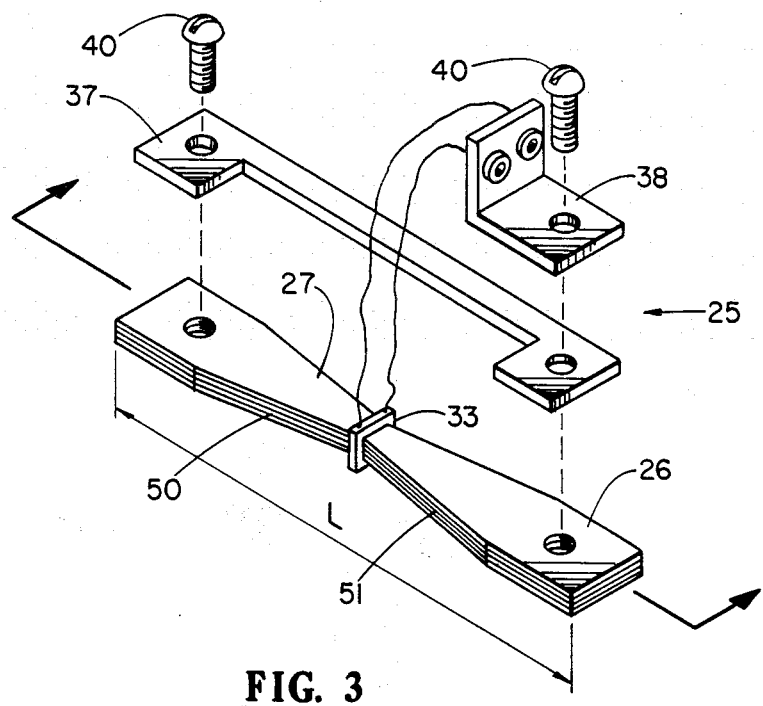
FIG. 3 is an expanded configuration of a magnetic mark detector assembly.
Figure 4:
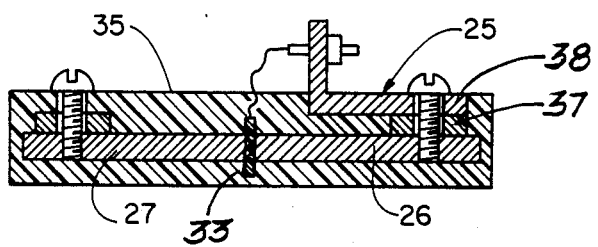
FIG. 4 is a view in cross section though an assembled magnetic mark detector along a vertical plane through axis 28.

Referring now to FIGS. 3 and 4, a detector head 25 or magnetic mark detector means is illustrated wherein two bar shaped and elongated magnetic head members 26 and 27 constructed of high permeability magnetic material such as transformer core material. The head members 26 and 27 are disposed end to end relative to a longitudinal axis 28 and have an overall length or magnetic detection span which is related to the length of magnetic span of the magnetic mark. In the present example, the overall length or magnetic detection span is 2 inches and the magnetic span of the mark is 2 inches. Thus, when the magnetic detection span of the magnetic head members is parallel to and directly over the magnetic span of a magnetic mark, the magnetic flux field is maximized through the head members 26 and 27. As the cable 10 or head 25 are moved relative to one another, the detection of flux increases from the time the head 25 first enter the flux field of a magnetic mark until the spans are coextensive with one another and decreases as the head 25 leaves the flux field.

The head members 26 and 27 are preferably tapered at the facing adjacent ends 30 and 31 of the head members toward the central longitudinal axis 28 extending through the head members to concentrate the flux toward the axis 28. The cross sectional area of the ends of the members is preferably equal to the effective response area of a detector 33. In the gap between the adjacent and facing ends of the head members, a conventional Hall field effect device 33 is located. The Hall device 33 and head members 26 and 27 are preferably potted in an epoxy 35 for positional stability. Attachment plate members 37 and 38 for mounting the head members and providing electrical take out terminals are also included in the encapsulation material. The plate members 37 and 38 are constructed for non-magnetic material. As shown in the drawings, the plate member 37 is "U" shaped to provide a recess for the Hall device 33 and to position screw openings above threaded screw openings in the head members. The plate member 38 is "L" shaped to provide a tab in which insulated output terminals can be connected to the Hall device and to the detector circuit. Screws 40 are used to affix the assembly to a support housing (not shown) so that when the support housing is positioned relative to the cable path the longitudinal axis 28 will be substantially aligned to and parallel to the cable axis.

The head members 26 and 27 serve to detect, amplify and focus the magnetic energy to the Hall device 33 and ignore the common mode magnetic fields such as the earth's magnetic field.

Referring back to FIG. 1, the strength measuring means 17 which receives an output from the flux concentrator and Hall effect device 33 includes an amplifier 42 with a calibrated gain factor to provide a voltage output calibrated terms of gauss input measured by the Hall device. Thus, the magnitude of the amplifier output reflects the strength of the detected magnetic mark. If a magnetic mark normally is intended to produce gauss measurements of say 5 gauss, then an output of the amplifier 42 of 5 volts can prevent an input of 5 gauss. In short, the amplifier is configured to provide 1 volt output per 1 gauss input. The amplifier output is compared in a comparison means 50 to a high reference voltage of say 4 volts (representing 4 gauss) and outputs a signal to the recorder 18 that the mark is at least 4 gauss strength. If the amplifier output is between 1.5 and 4 volts then a comparison means 51 with a reference of 1.5 volts to 4 volts provides an output signal representative of a weak mark to the recorder. A signal less than 1.5 volts would produce no output and thus indicate no effective mark.

The relative detection of weak and strong marks is predetermined to the detection capabilities of the detector 16 and the operator can set the level desired in the comparison means 50 and 51 to indicate strong and weak marks.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A magnetic mark detector system for detecting magnetic marks on a cable where each of such marks have a predefined magnetic span between opposite poles including:

magnetic flux concentrator means including elongated bar members disposed end to end relative to one another along a longitudinal axis, said bar members having facing end sections configured to focus magnetic flux toward a longitudinal axis extending through said bar members, Hall effect means disposed between the facing ends of said bar members for responding to magnetic flux in said bar members and providing an output signal as a function of magnetic flux detected, and said bar members and said Hall device, in assembly, having an overall span length along said longitudinal axis matched to a predefined magnetic span of a magnetic mark on a cable, said bar members being constructed from high permeability magnetic material.

2. The apparatus as defined in claim 1 wherein said facing end sections of said bar members are tapered toward to a cross-sectional area substantially equal to the effective detection area of the Hall effect means.

3. The apparatus as defined in claim 1 wherein the bar members and Hall effect means are encapsulated in a non-magnetic binder material.

4. The apparatus as defined in claim 1 wherein non-magnetic attachment plate members are coupled to said bar members.

5. Apparatus as defined in claim 1 and further including amplifier means coupled to said Hall effect means for providing an output signal as a function of the magnetic flux detected by the Hall device, and comparison means coupled to said amplifier for comparing the output signal from an amplifier to a reference value for providing an output signal as a function of the relative strength of a magnetic mark.

6. The apparatus as defined in claim 5 and further including means for recording the output signal from a comparison means.

7. A method for detecting the strength of magnetic marks on a cable where each of such magnetic marks have a predefined magnetic span between opposite magnetic poles including the steps of:

passing a cable lengthwise and parallel relative to the lengthwise configuration of a magnetic mark detector in sufficient proximity to the magnetic mark detector for detecting magnetic marks where the overall length of the magnetic mark detector is substantially equal to the predefined magnetic span of a magnetic mark on a cable, concentrating the magnetic flux of a magnetic mark on a cable in the magnetic mark detector when a magnetic mark on a cable passes the magnetic mark detector and focusing the magnetic flux onto a magnetic flux detector located centrally of the magnetic mark detector, and developing an output signal from the magnetic flux detector as a function of the detected magnetic flux.

8. The method as set forth in claim 7 and including the further step of comparing the output signal to a reference value and producing a signal representative of the relative strength of the detected magnetic flux.

9. The method as defined in claim 7 and further including the step of recording the signal representative of the strength of the detected magnetic flux.

* * * * *